(12) United States Patent
Ieda et al.

(10) Patent No.: US 7,049,940 B2
(45) Date of Patent: May 23, 2006

(54) DOOR OPENING/CLOSING DEVICE FOR A VEHICLE AND A METHOD OF RECOGNIZING AN OPENING/CLOSING OPERATION OF A VEHICLE DOOR

(75) Inventors: Kiyokazu Ieda, Chiryu (JP); Yuichi Murakami, Chiryu (JP); Eiji Mushiake, Aichi-ken (JP); Hisashi Inaba, Kariya (JP); Masahiro Ueda, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 11 days.

(21) Appl. No.: 10/601,874

(22) Filed: Jun. 24, 2003

(65) Prior Publication Data

US 2004/0075531 A1   Apr. 22, 2004

(30) Foreign Application Priority Data

Jun. 24, 2002   (JP)   ............................ 2002-183194

(51) Int. Cl.
   *B60Q 1/00*   (2006.01)
(52) U.S. Cl. .............................. 340/425.5; 340/545.1; 340/430; 340/686.6; 340/5.72; 340/5.61; 307/10.5
(58) Field of Classification Search ........... 340/426.28, 340/426.36, 5.72, 10.5, 686.6, 691.1, 5.1, 340/5.8, 407.1; 362/501, 802
   See application file for complete search history.

(56) References Cited

U.S. PATENT DOCUMENTS

| | | | | |
|---|---|---|---|---|
| 4,929,936 A | * | 5/1990 | Friedman et al. | 345/618 |
| 6,135,621 A | * | 10/2000 | Bach et al. | 362/399 |
| 6,164,805 A | * | 12/2000 | Hulse | 362/501 |
| 6,260,988 B1 | * | 7/2001 | Misawa et al. | 362/276 |
| 6,360,572 B1 | | 3/2002 | Garnault | |
| 6,522,027 B1 | * | 2/2003 | Morillon et al. | 307/10.3 |
| 6,550,103 B1 | * | 4/2003 | Koops et al. | 16/412 |
| 6,648,493 B1 | * | 11/2003 | Klein | 362/501 |
| 6,700,475 B1 | * | 3/2004 | Geber et al. | 340/5.61 |
| 6,809,630 B1 | * | 10/2004 | Dreimann et al. | 340/5.62 |
| 2001/0028297 A1 | * | 10/2001 | Hara et al. | 340/5.62 |
| 2002/0157436 A1 | | 10/2002 | Klein | |

FOREIGN PATENT DOCUMENTS

| | | |
|---|---|---|
| DE | 101 21 046 A1 | 11/2002 |
| EP | 1 006 028 A2 | 6/2000 |
| JP | 2000-45593 A | 2/2000 |
| JP | 2000-160897 A | 6/2000 |
| WO | WO 97/41322 | * 11/1997 |

* cited by examiner

*Primary Examiner*—Benjamin C. Lee
(74) *Attorney, Agent, or Firm*—Buchanan Ingersoll PC (57) ABSTRACT

A door opening/closing device for a vehicle includes a control mechanism recognizing an opening/closing operation of a vehicle door based upon an operation of a door handle, operating a door lock mechanism so as to unlock the vehicle door when the opening operation of the vehicle door is recognized, operating the door lock mechanism so as to lock the vehicle door when the closing operation of the vehicle door is recognized, and controlling a light-emitting means included in the door handle to light-emit In response to the operation of the door lock mechanism.

7 Claims, 10 Drawing Sheets

DOOR OPENING/CLOSING DEVICE FOR A VEHICLE AND A METHOD OF RECOGNIZING AN OPENING/CLOSING OPERATION OF A VEHICLE DOOR

CROSS REFERENCE TO RELATED APPLICATIONS

This application is based on and claims priority under 35 U.S.C. §119 with respect to a Japanese Patent Application 2002-183194, filed on Jun. 24, 2002, the entire content of which is incorporated herein by reference.

FIELD OF THE INVENTION

This invention generally relates to a vehicle door opening/closing device which detects a user coming close to a vehicle, unlocks a vehicle door upon a vehicle door opening operation, and locks the vehicle door upon a vehicle door closing operation.

BACKGROUND OF THE INVENTION

A known smart entry system (a locking system) applicable for a vehicle door opening/closing device is disclosed in a European Patent Laid-Open Publication published as No.1,006,028 A2 which corresponds to a Japanese Patent Laid-Open Publication published as No. 2000-160897. The disclosed smart entry system enables the detection of whether or not a user carrying a portable station (i.e. a remote-controller) has come close to or been away from a vehicle door. The vehicle door is hence automatically locked or unlocked in response to the detected result. In light of foregoing, the smart entry system enhances the convenience for opening/closing the vehicle door and the safety thereof.

The above-described publication discloses the automatic unlock/lock operation of the vehicle door. However, it does not appear to disclose how the vehicle door unlocked/locked condition is warned to the user. According to the disclosed smart entry system, it may be difficult for the user to acknowledge whether or not the vehicle door has been actually locked without any warning to the user. Therefore, recent requirements have been made to warn the user that the vehicle door has been locked or unlocked in some way.

According to a Japanese Patent Laid-Open Publication published as No. 2000-45593, disclosed are an outputted light control signal and an outputted sound control signal. The light control signal is referred to for determining an amount or quality of light emitted from a luminous member such as a dome light for illuminating a vehicle interior, a head lamp, and a tail lamp in accordance with a lightness outside the vehicle. The sound control signal is referred to for determining a volume or quality of a sound emitted from a sounding member in accordance with the lightness outside the vehicle. More particularly, when it is as light as day outside the vehicle, the light emitted from the luminous member may not be sufficient as a single parameter for recognizing the vehicle door condition. In this case, the light emitting amount is reduced and a buzzer sound can be used along with the emitted light as the parameter for recognizing the vehicle door condition. On the other hand, when it is as dark as evening or night outside the vehicle, the buzzer sound volume is reduced and the emitted light can be used along with the buzzer sound as the parameter for recognizing the vehicle door condition. Therefore, the user can easily acknowledge whether the vehicle door has been locked or unlocked.

However, the luminous member such as the dome light for illuminating the vehicle interior, the head lamp, and the tail lamp is provided at a distance from a door handle manually operated when the user intends to open or close the vehicle door. Therefore, according to the vehicle door opening/closing device, in which the vehicle door is automatically locked or unlocked based upon the manual operation of the door handle, the user may not be surely acknowledged of the vehicle door condition in view of a visual field. In other words, the luminous member such as the dome light, the head lamp, and the tail lamp is beyond the user's visual field so that the user may not be surely acknowledged of the vehicle door condition.

The present invention therefore seeks to provide an improved vehicle door opening/closing device capable of surely warning the user of the vehicle door condition (i.e. locked or unlocked).

SUMMARY OF THE INVENTION

In light of foregoing, according to an aspect of the present invention, a door opening/closing device for a vehicle includes a door handle operated for opening/closing a vehicle door, a door lock mechanism for locking and unlocking the vehicle door, a light-emitting means included in the door handle and visible from an outside the door handle, and a control mechanism for recognizing the opening/closing operation of the vehicle door based upon the operation of the door handle, operating the door lock mechanism so as to unlock the vehicle door when the opening operation of the vehicle door is recognized, operating the door lock mechanism so as to lock the vehicle door when the closing operation of the vehicle door is recognized. The control mechanism controls the light-emitting means to light-emit in response to the operation of the door lock mechanism.

It is preferable that the control mechanism recognizes the vehicle door opening operation based upon the operation of the door handle under a condition that a portable station carried by a user is close to the vehicle from a vehicle outside, and recognizes the vehicle door closing operation based upon the operation of the door handle and recognition of the portable station moved from a vehicle inside to the vehicle outside.

It is further preferable that the door handle includes at least a first light-emitting means and a second light-emitting means, and the first and second light-emitting means are controlled individually. For example, the control mechanism controls the second light-emitting means to light-emit upon the door unlock operation of the door lock mechanism and controls the first light-emitting means to light-emit upon the door lock operation thereof.

According to another aspect of the present invention, a method of recognizing an opening operation of a vehicle door includes steps of recognizing that a user carrying a portable station is coming close to a vehicle from a vehicle outside, controlling a light-emitting means to emit light when the user carrying the portable station is recognized to be coming close to the vehicle, judging whether or not a user's hand is in contact with a door handle, unlocking the vehicle door by operating a door lock mechanism when the user's hand is judged to be in contact with the door handle, and controlling the light-emitting means to emit light for a predetermined time in a different manner from a light-emitting manner during the portable station coming close to the vehicle from the vehicle outside.

It is preferable that the light-emitting means is controlled to continuously light-up when the user carrying the portable station is recognized to be coming close to the vehicle and the light emitting means is controlled to blink for the predetermined time when the vehicle door is unlocked.

It is still preferable that the light-emitting means includes a first light-emitting means and a second light emitting means. The first light-emitting means is controlled to light-up when the user carrying the portable station is recognized to be coming close to the vehicle and the second light-emitting means is controlled to light-up for the predetermined period of time when the vehicle door is unlocked.

According to further aspect of the present invention, a method of recognizing a closing operation of a vehicle door includes steps of recognizing that a user carrying a portable station has moved from a vehicle inside to a vehicle outside, controlling a light-emitting means to emit light when the user carrying the portable station is recognized to have moved from the vehicle inside to the vehicle outside, judging whether or not a user's hand is in contact with a door handle, locking the vehicle door by operating a door lock mechanism when the user's hand is judged to be in contact with the door handle, and controlling the light-emitting means to emit light in a different manner from a light-emitting manner during the portable station having moved to the vehicle outside from the vehicle inside.

It is preferable that the light-emitting means is controlled to blink when the user carrying the portable station is recognized to have moved from the vehicle inside to the vehicle outside and the light emitting means is controlled to continuously light-up when the vehicle door is locked.

It is still preferable that the light-emitting means includes a first light-emitting means and a second light emitting means. The second light-emitting means is controlled to light-up when the user carrying the portable station is recognized to have moved from the vehicle inside to the vehicle outside and the first light-emitting means is controlled to light-up when the vehicle door is locked.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

A preferred embodiment of the present invention will be described hereinbelow in detail with reference to the accompanying drawings.

Figure 1:
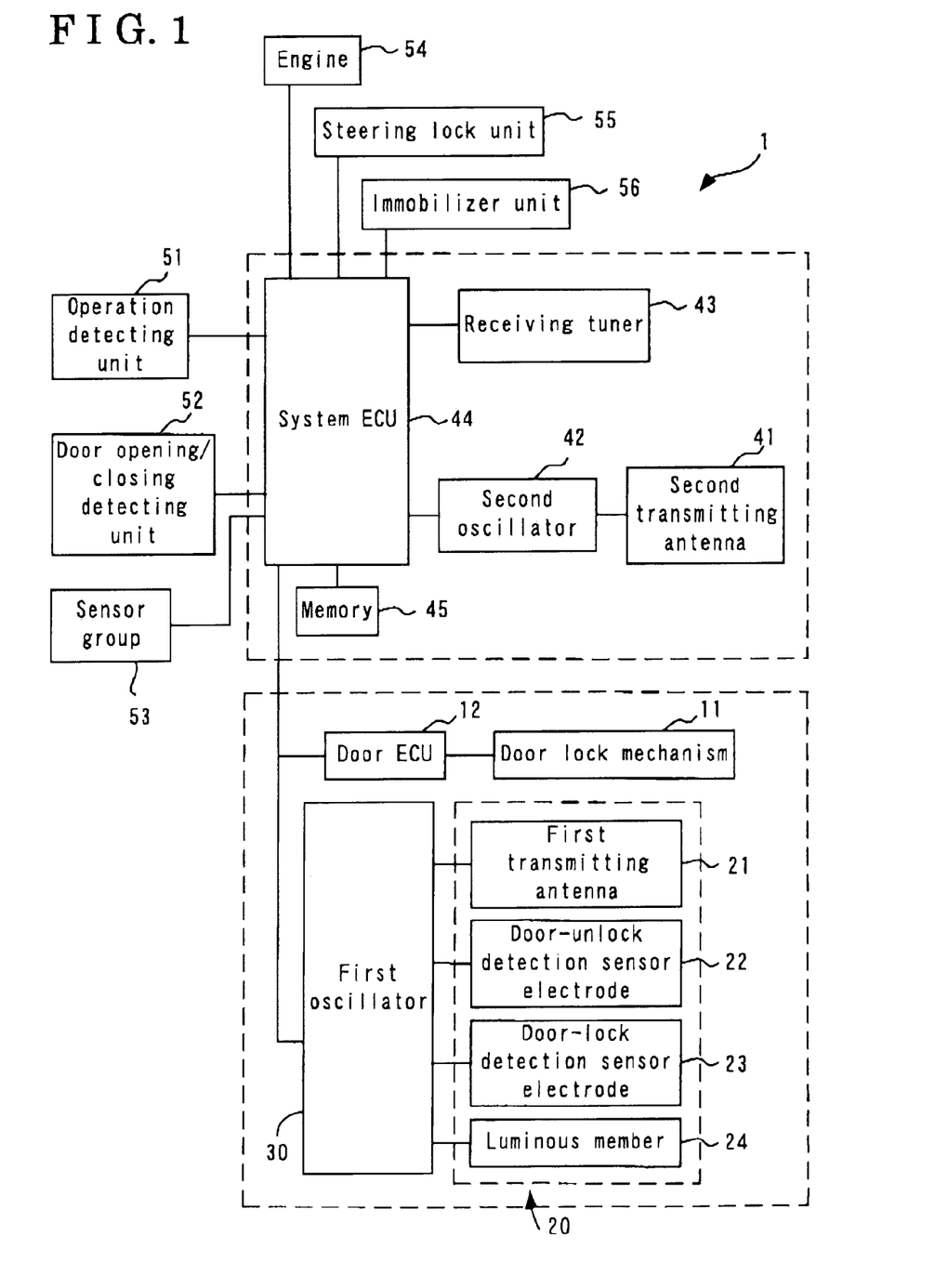
FIG. 1 is a block view schematically illustrating a vehicle door opening/closing device applied for a keyless entry system (a smart entry system) according to an embodiment of the present invention.

As illustrated in FIG. 1, a keyless entry system (i.e., a smart entry system and a door opening/closing device) 1 judges whether a user carrying a portable station 60 such as a remote-controller (shown in FIG. 2) is coming close to the vehicle or moving away from the vehicle. When a door handle is manually operated by the user during the user coming closer to the vehicle, the vehicle door condition is switched between a locked condition and an unlocked condition by a door lock mechanism 11 mounted adjacent to the vehicle door. In this case, a vehicle key is not required for switching the vehicle door condition between the locked and unlocked conditions.

As illustrated in FIG. 1, a door panel is provided with the door lock mechanism 11 operated for unlocking and locking the vehicle door, a door ECU 12 for controlling operation of the door lock mechanism 11, a door handle 20 fixed at an outer side of the door panel and embedding a first transmitting antenna 21 for communicating with a vehicle outside, and a first oscillator 30 connected with the first transmitting antenna 21 of the door handle 20. As described later, further embedded in the door handle 20 are a door-unlock detection sensor electrode 22 (i.e. a sensor electrode), a door-lock detection sensor electrode 23 (i.e. the sensor electrode), and a luminous member 24 (i.e. a light-emitting means). Embedded in the vehicle are a second transmitting antenna 41 used in the vehicle, a second oscillator 42 connected with the second transmitting antenna 41, a receiving tuner 43, and a system ECU 44. The second transmitting antenna 41 can be provided at a portion to which a radio wave can be radiated inside the vehicle, such as a center consol. The system ECU 44 is connected to the second oscillator 42 and the receiving tuner 43. The receiving tuner 43 can be provided, for example in a vehicle inner mirror.

The system ECU 44 in the vehicle is connected to an operation detecting unit 51, a door opening/closing detecting unit 52, and a sensor group 53. The operation detecting unit 51 detects operations of various switches by the user. For example, when the operation detecting unit 51 detects operation of an ignition switch (not shown), the operation detecting unit 51 supplies a detection signal indicating the operation of the ignition switch to the system ECU 44. The door opening/closing detecting unit 52 detects opening/closing operation of the vehicle door on a side of a driver seat (or each door of the vehicle) and supplies a detection signal to the system ECU 44. The sensor group 53 includes various sensors for detecting vehicle conditions such as a vehicle speed and a window opening/closing condition. These sensors supply detection signals to the system ECU 44. The door ECU 12 and the system ECU 44 correspond to a control mechanism which is claimed according to the present invention. According to the embodiment of the present invention, the system 1 includes the system ECU 44 for controlling an entire system and the door ECU 12 for controlling the operation of the door lock mechanism 11. Alternatively, a single ECU can be provided, which functions in substitution for the ECUS 12 and 44.

The system ECU 44 in the vehicle is further connected to an engine 54, a steering lock unit 55, and an immobilizer unit 56. The steering lock unit 55 prohibits a steering operation by mechanically locking a steering wheel (not shown). The immobilizer unit 56 prohibits fuel supply to the engine 54 and further prohibits the ignition of the engine 54 for dishonest purposes. The ignition of the engine 54 can be controlled by an engine control portion (not shown) in the system ECU 44.

The system ECU 44 transmits a first request signal and a second request signal to the first oscillator 30 and the second oscillator 42, respectively. The first request signal is used outside the vehicle and the second request signal is used inside the vehicle. According to the embodiment of the present invention, the first transmitting antenna 21 and the second transmitting antenna 41 transmit the request signal having a frequency at 134 kHz toward the portable station 60 as the first request signal and the second request signal, respectively. The receiving tuner 43 receives an ID information signal transmitted from the portable station 60. According to the embodiment of the present invention, the ID information signal has a frequency at 315 MHz. The ID information signal is received and demodulated by the receiving tuner 43 and is supplied to the system ECU 44. The system ECU 44 houses a memory 45 which contains a plurality of different codes stored therein such as a code for unlocking and locking the vehicle door, a code for starting the engine 54, and a transponder ID code. For example, the memory 45 is a nonvolatile memory such that contents stored in the memory 45 can be maintained even if power supply to the memory 45 is shut off.

Figure 2:
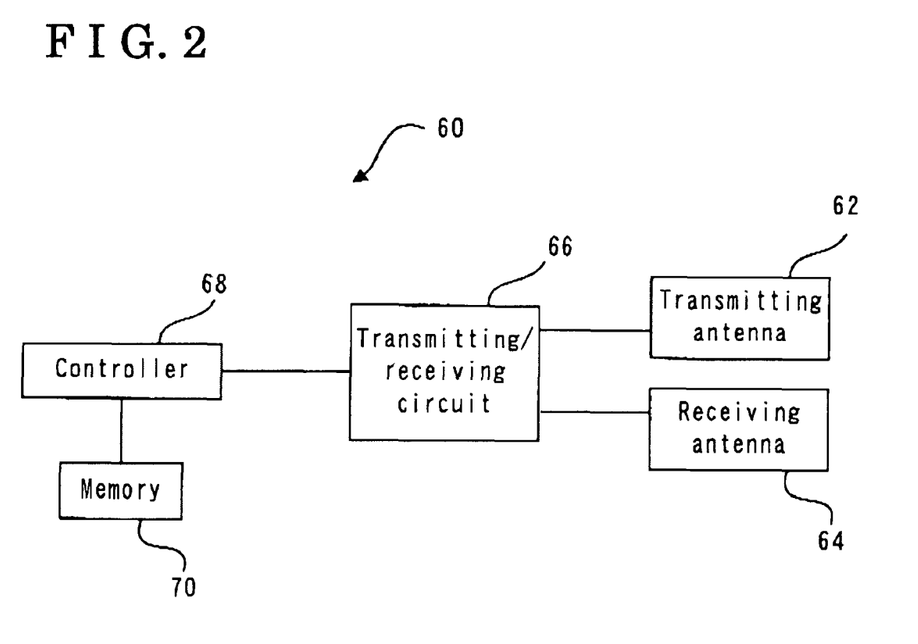
FIG. 2 is a block view schematically illustrating a portable station used for the smart entry system illustrated in FIG. 1.

As illustrated in FIG. 2, the portable station 60 is provided with a transmitting antenna 62 and a receiving antenna 64. The transmitting antenna 62 transmits the ID information signal at 315 MHz to the vehicle. The receiving antenna 64 receives the request signal transmitted at 134 kHz from the vehicle. The transmitting antenna 62 and the receiving antenna 64 are connected to a transmitting/receiving circuit 66 connected to a controller 68.

When the receiving antenna 64 of the portable station 60 receives the first request signal having the frequency at 134 kHz transmitted from the vehicle, the received signal is demodulated in the transmitting/receiving circuit 66 and then supplied to the controller 68. The controller 68 transmits a code stored in a memory 70 to the transmitting/receiving circuit 66. The transmitting/receiving circuit 66 modulates the code including the ID information. At this point, the ID information signal having the frequency at 315 MHz is transmitted to the receiving tuner 43 in the vehicle.

Next, the description will be given for explaining an operation of the smart entry system 1 while the vehicle is parked. When the vehicle has been parked, the request signal is transmitted from the system ECU 44 to the first oscillator 30 in the door panel. The first request signal having the frequency at 134 kHz is transmitted as the radio wave from the first transmitting antenna 21 to the vehicle outside. When the user carrying the portable station 60 comes close to the vehicle, the receiving antenna 64 of the portable station 60 receives the first request signal. The received signal is demodulated in the transmitting/receiving circuit 66 and then supplied to the controller 68. The ID information signal having the frequency at 315 MHz is hence transmitted from the transmitting antenna 62 to the receiving tuner 43. The ID information signal is eventually transmitted from the receiving tuner 43 to the system ECU 44. Therefore, the system ECU 44 can recognize that the portable station 60 has come close to the vehicle. The system ECU 44 selects a door unlock mode when the vehicle door manual operation is detected during the user carrying the portable station 60 being close to the vehicle.

In the door unlock mode, the system ECU 44 controls the luminous member 24 to continuously light-emit via the first oscillator 30. Therefore, the user can visually confirm that the ID information signal has been transmitted from the portable station 60 to the vehicle, i.e. can visually confirm the door unlock mode has been actually selected.

When the door handle 20 is gripped by the user in the door unlock mode, the door-unlock detection sensor electrode 22 transmits a sense signal to the system ECU 44 via the first oscillator 30. The system ECU 44 processes the sense signal and transmits a door unlock signal to the door ECU 12, whereby the door lock mechanism 11 is operated for unlocking the vehicle door. At this point, a signal for controlling the luminous member 24 to light-emit is transmitted to the luminous member 24 via the first oscillator 30, wherein the luminous member 24 is controlled to blink. Therefore, the user can visually confirm that the vehicle door is unlocked.

Next, the following description will be given for explaining the operation of the smart entry system 1 when the user moves from the vehicle inside to the vehicle outside. When the user is inside the vehicle, the request signal is transmitted from the system ECU 44 to the second oscillator 42. The second request signal is then transmitted as the radio wave from the second transmitting antenna 41 to the vehicle inside. When the portable station 60 is inside the vehicle, the second request signal from the second transmitting antenna 41 is received by the portable station 60 inside the vehicle and the ID information signal from the transmitting antenna 62 of the portable station 60 is received by the receiving tuner 43. When the user is moved to the vehicle outside from the aforementioned condition that the portable station 60 is inside the vehicle, the portable station 60 cannot receive the second request signal from the second transmitting antenna 41 any more. In this case, the ID information signal based upon the second request signal cannot be transmitted to the receiving tuner 43 any more. At this point, the system ECU 44 identifies that the portable station 60 was moved from the vehicle inside to the vehicle outside, i.e. identifies that the user moved from the vehicle inside to the vehicle outside. The system ECU 44 selects a door lock mode in response to the closing operation of the vehicle door.

In the door lock mode, the system ECU 44 controls the luminous member 24 to blink via the first oscillator 30. Therefore, the user can visually confirm that the vehicle door can be locked, i.e. can visually confirm that the vehicle door can be locked in response to the manual operation of the door handle 20.

When the door handle 20 is gripped by the user under the door lock mode, the door-lock detection sensor electrode 23 transmits a lock signal to the system ECU 44 via the first oscillator 30. The system ECU 44 processes the lock signal and transmits the request signal to the first oscillator 30. The first transmitting antenna 21 then transmits the first request signal as the radio wave to the vehicle outside. At this point, the user carrying the portable station 60 is close to the vehicle door outside such that the ID information signal can be transmitted from the portable station 60 to the receiving tuner 43. The received signal by the receiving tuner 43 is transmitted to the system ECU 44. As described above, when the system ECU 44 identifies that the user carrying the portable station 60 is outside the vehicle, the system ECU 44 transmits a door lock signal to the door ECU 12 in response to the contact of the user with the door handle 20, whereby the door lock mechanism 11 is operated for locking the vehicle door. At this point, a signal for controlling the luminous member 24 to continuously light-up is transmitted to the luminous member 24 via the first oscillator 30, wherein the luminous member 24 is controlled to continuously light-up. Therefore, the user can visually confirm that the vehicle door is locked.

Figure 4:
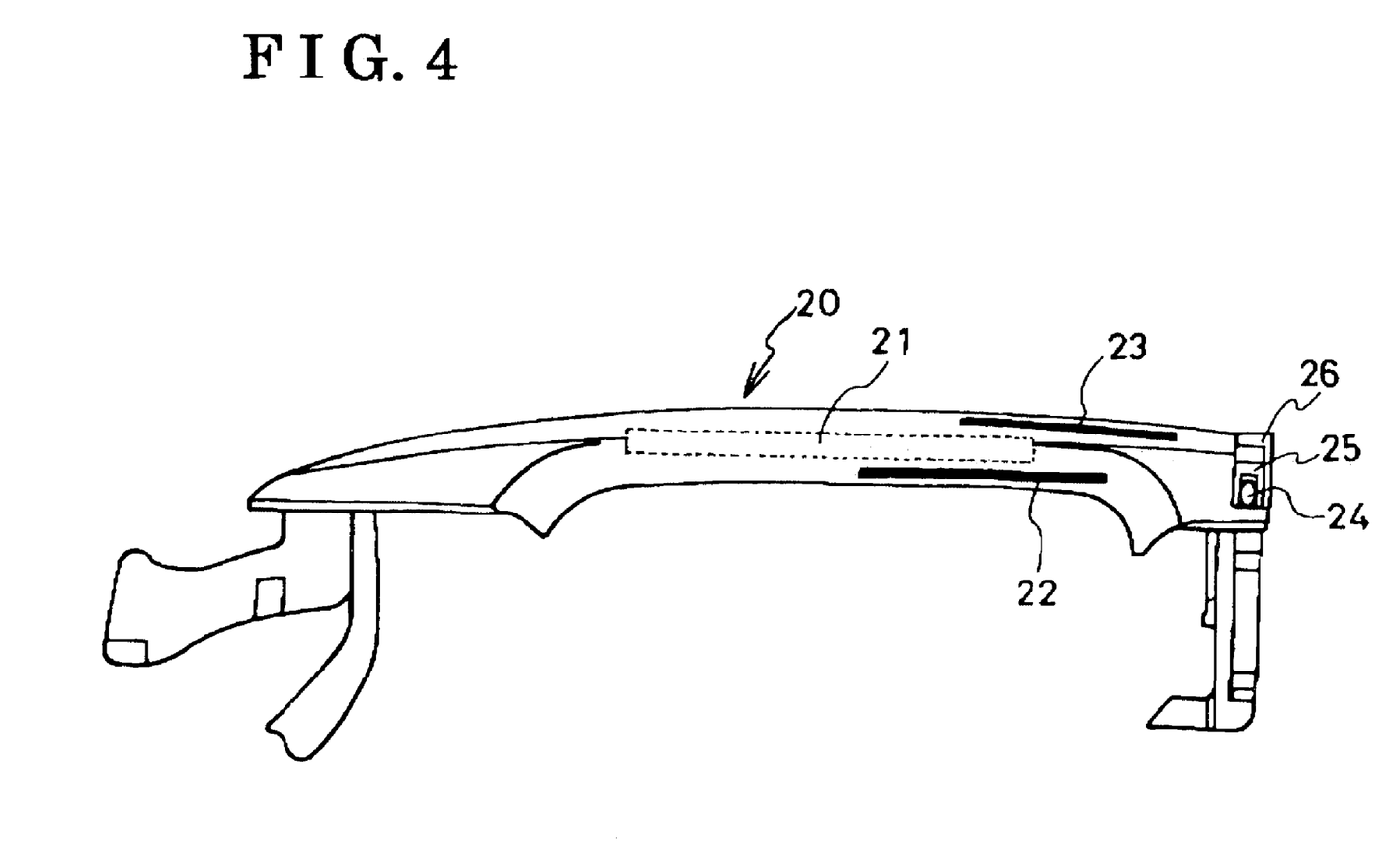
FIG. 4 is a cross sectional view schematically illustrating the door handle.

Next, the following description will be given for explaining details of the first oscillator 30 and the door handle 20. As illustrated in FIG. 4, the door handle 20 of a grip type according to the embodiment of the present invention is mounted to an outer door panel of the door and the vehicle door can be opened when a grip portion GP at a central portion of the door handle 20 is gripped. Alternatively, the door handle 20 is not limited to the grip type and a different type of the door handle can be employed.

Figure 3:
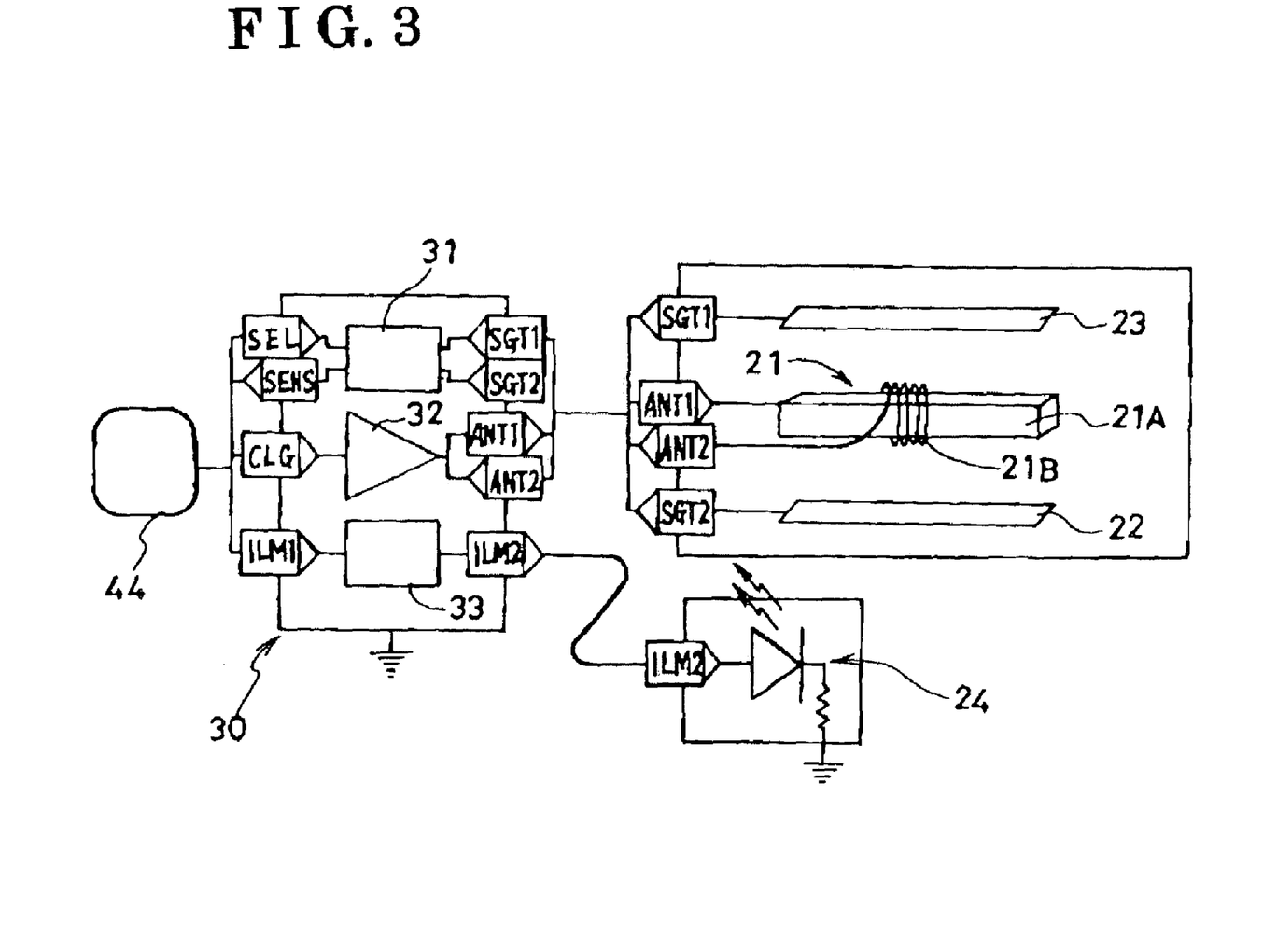
FIG. 3 is a block view illustrating details of a door handle and a first oscillator which are illustrated in FIG. 1.

As illustrated in FIG. 3, the first oscillator 30 includes a sensor electrode driver 31, a transmitting amplifier 32, and a lighting driver 33. The first request signal outputted from the system ECU 44 is inputted to a CLG terminal, modulation-amplified by the transmitting amplifier 32, and transmitted to the first transmitting antenna 21 via ANT1 and ANT2 terminals. The first request signal received by the first transmitting antenna 21 is transmitted as the radio wave to the vehicle outside. The signals outputted from the system ECU 44 in the door lock mode and the door unlock mode is inputted to a SEL terminal such that the sensor electrode driver 31 connected to the SEL terminal is activated. The sensor electrode driver 31 drives the door-lock detection sensor electrode 23 via an SGT1 terminal and drives the door-unlock detection sensor electrode 22 via an SGT2 terminal. The first transmitting antenna 21, the detection sensor electrodes 22, 23 and the luminous member 24 are electrically connected to the respective terminals.

Figure 10:
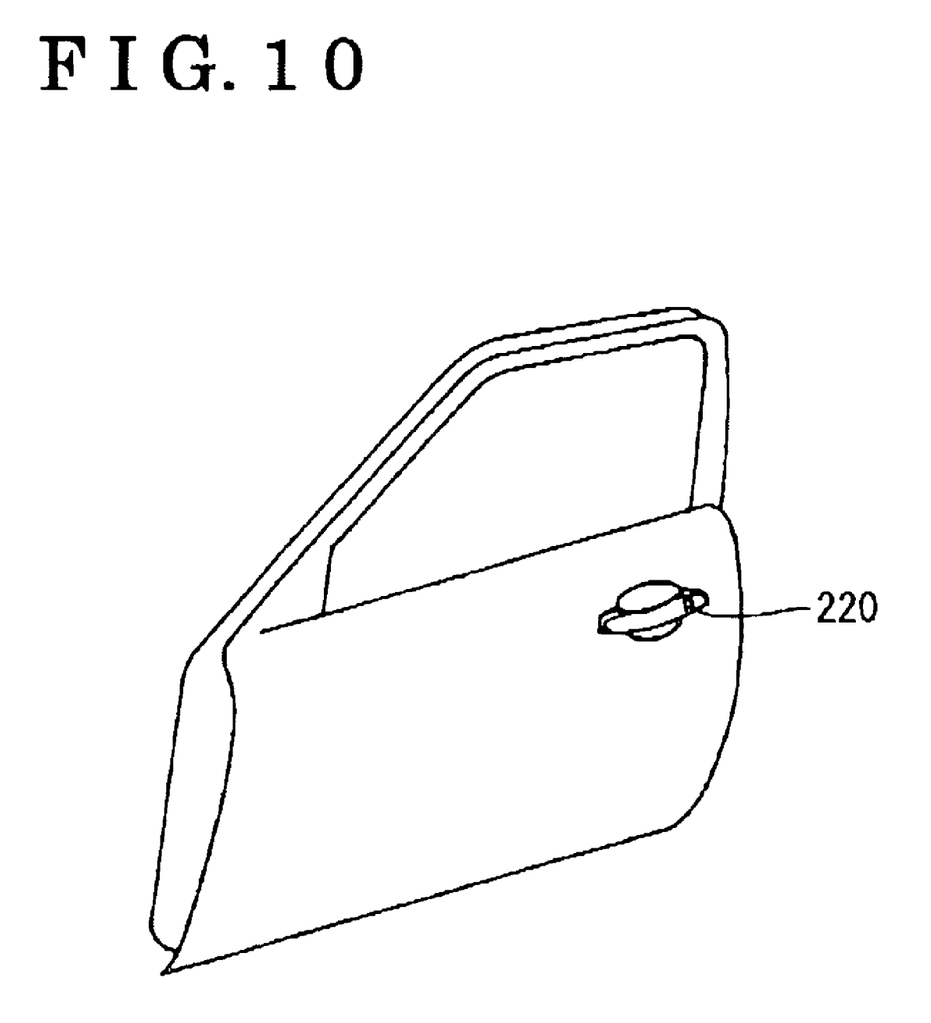
FIG. 10 is a block view illustrating an operational switch according to a modified embodiment of the present invention.

The first transmitting antenna 21 includes a ferrite core 21A possessing a rectangular solid and a coil 21B wound around the ferrite core 21A at a right angle relative to a longitudinal direction of the ferrite core 21A. The door-lock detection sensor electrode 23 is a capacitance type sensor electrode and is embedded in a front side of the door handle 20 (in an upper side in FIG. 4). The door-lock detection sensor electrode 23 functions for recognizing the manual operation of the door handle 20, i.e. the contact with the door handle 20, when the user is closing the vehicle door. The door-unlock detection sensor electrode 22 is also a capacitance type sensor electrode and is embedded in a backside of the door handle 20 (in a lower side in FIG. 4). The door-unlock detection sensor electrode 22 functions for recognizing the manual operation of the door handle 20, i.e. the contact with the door handle 20, when the user is opening the vehicle door. As described above, according to the embodiment of the present invention, the system ECU 44 recognizes the manual operation of the door handle 20 based upon a change of the capacitance detected by the sensor electrode 22 or 23 when the door handle 20 is manually operated. Alternatively, the manual operation of the door handle 20 can be recognized based upon a switch-on operation of an operational switch 220 (illustrated in FIG. 10). FIG. 10 shows the operational switch 220 provided at the door handle 20 at a left-side vehicle door. However, the operational switch 220 can be provided at the door handle 20 at a different vehicle door such as a right-side vehicle door.

When the vehicle door is manually opened, the user comes in contact with the backside of the door handle 20 so as to pull the door handle 20 outwardly in a lateral or longitudinal direction of the vehicle. Therefore, the door-unlock detection sensor electrode 22 detects the manual opening operation of the vehicle door in response to the contact with the backside of the door handle 20. In this case, the sensor electrode driver 31 detects the change of the signal emitted from the SGT2 terminal and transmits the sense signal to the system ECU 44 via a SENS terminal. On the other hand, when the vehicle door is manually closed, the user comes in contact with the front side of the door handle 20. Therefore, the door-lock detection sensor electrode 23 detects the manual closing operation of the vehicle door in response to the contact with the front side of the door handle 20. In this case, the sensor electrode driver 31 detects the change of the signal emitted from the SGT1 terminal and transmits the lock signal to the system ECU 44 via the SENS terminal. When the system ECU 44 controls the luminous member 24 to light-emit, a signal is transmitted from the system ECU 44 to an ILM1 terminal in the first oscillator 30 so as to activate the lighting driver 33. The lighting driver 33 drives the luminous member 24 to continuously light-emit or to blink.

Figure 5:
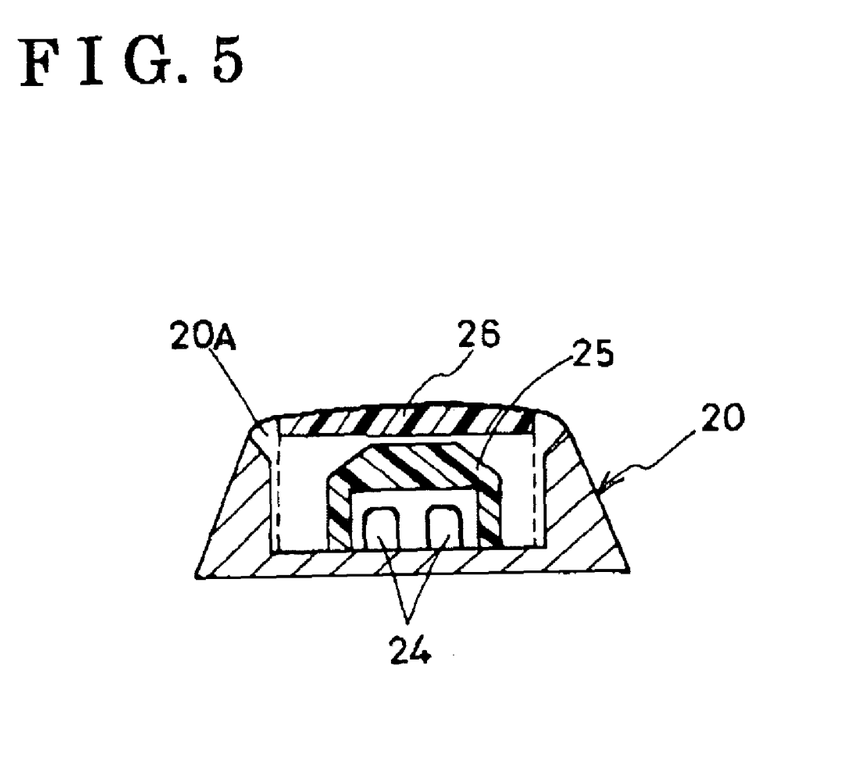
FIG. 5 is a cross sectional view of a portion of the door handle which includes a luminous member.
Figure 6:
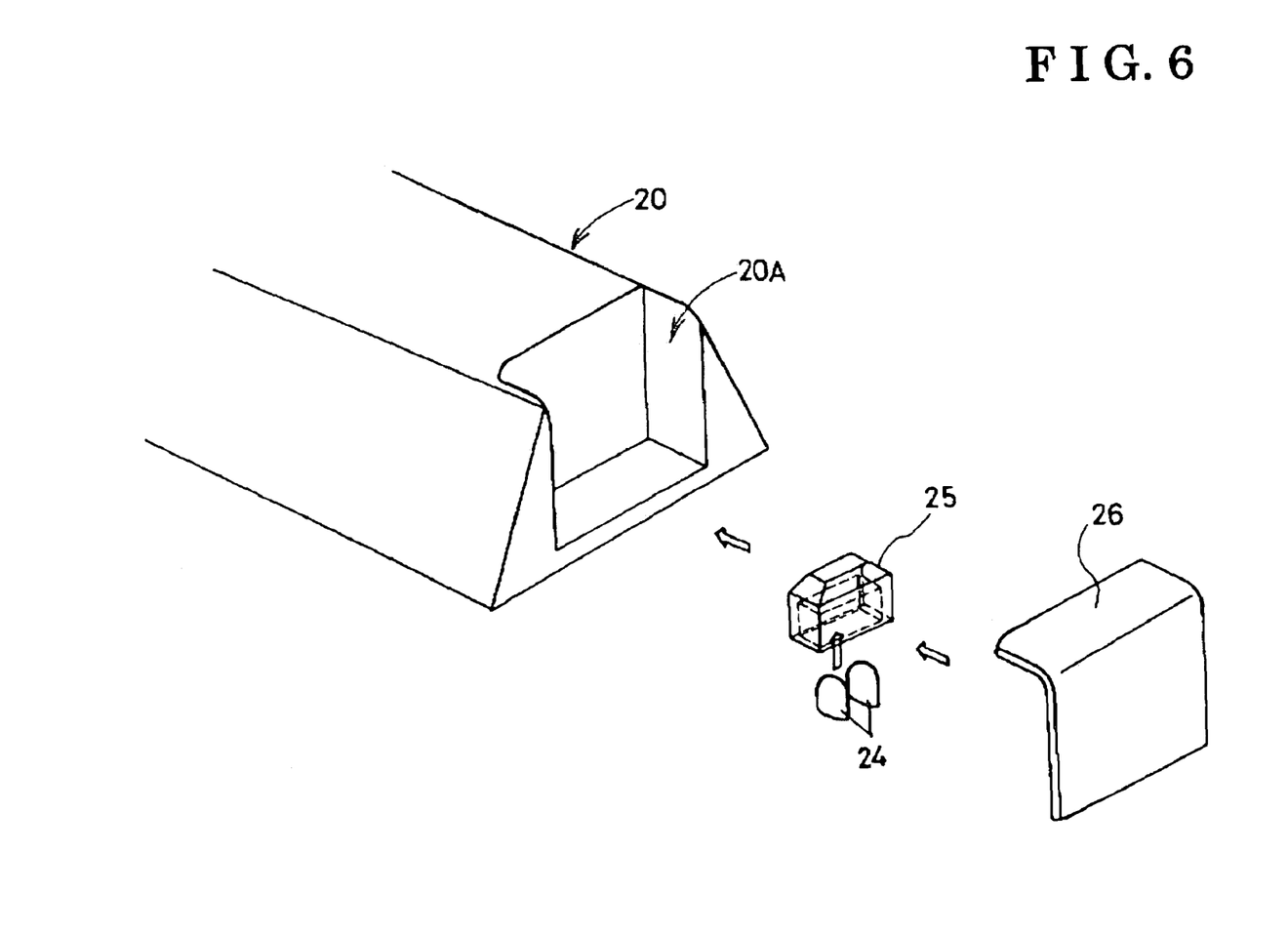
FIG. 6 is a perspective view explaining assembling of the luminous member to the door handle.

Next, the following description will be given for explaining the luminous member 24 embedded in the door handle 20. As illustrated in FIGS. 5 and 6, for example, a high brightness LED (light emitting diode) can be used as the luminous member 24. The luminous member 24 is surrounded by a light diffusion resin 25 and is housed in a housing portion 20A, which is defined at an end portion of the door handle 20, along with a transparent acryl 26 surrounding the light diffusion resin 25. The light diffusion resin 25 is preferably used so as to restrain light diffusion. According to the embodiment of the present invention, the luminous member 24 is surrounded by the light diffusion resin 25 such that the light emitted from the luminous member 24 can be effectively restrained from the light-diffusion. Therefore, the user can visually confirm the light emitted from the luminous member 24 regardless of the brightness outside around the vehicle.

Figure 7:
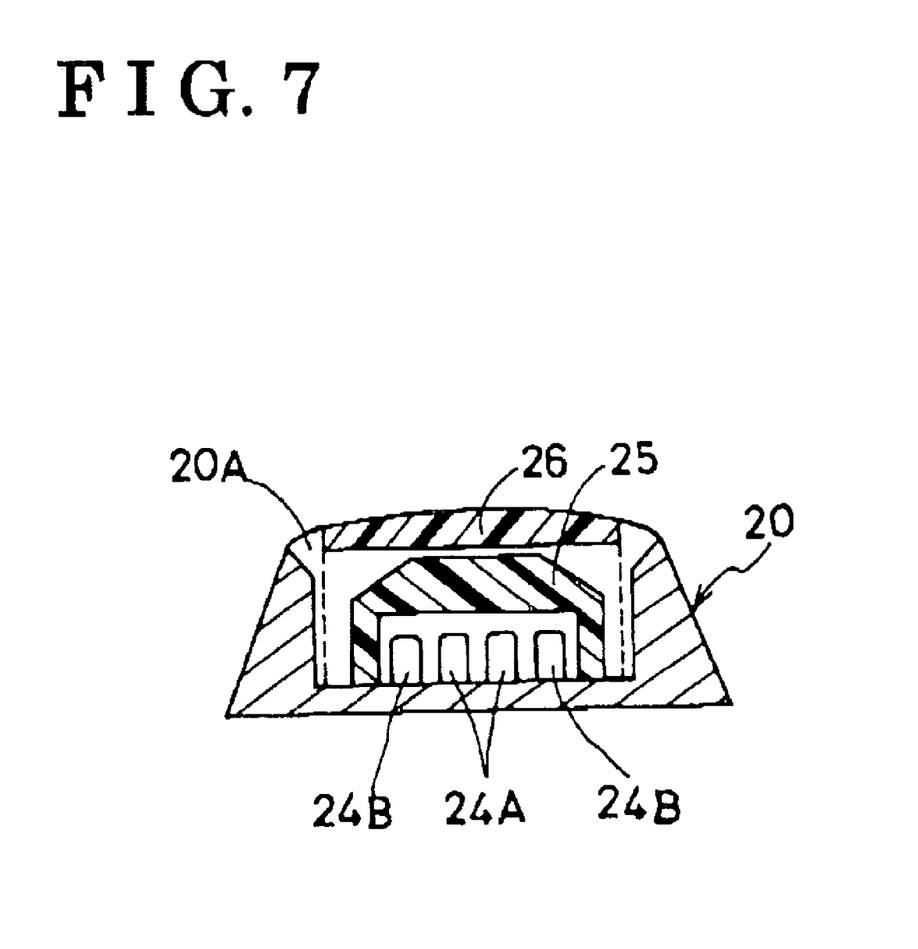
FIG. 7 is a cross sectional view of a portion of the door handle which includes a luminous member according to a modified mode of the embodiment.

FIG. 7 shows a modified example of the luminous member 24 according to the embodiment of the present invention. As illustrated in FIG. 7, the door handle 20 houses a combination of a first LED 24A (i.e. the light-emitting means, a first light-emitting means) and a second LED 24B (i.e. the light-emitting means, a second light-emitting means) which emits a different light from the first LED 24A, in substitution for the luminous member 24. The other structure such as the light diffusion resin 25, the transparent acryl 26, and the housing portion 20A are provided in the same manner as the first embodiment of the present invention. When the door handle 20 provided with the first LED 24A and the second LED 24B is used for the smart entry system 1, the emitted light can be varied in accordance with the vehicle door condition. For example, the first LED 24A can be controlled to light-emit upon unlocking the vehicle door and the second LED 24B can be controlled to light-emit upon locking the vehicle door. As an further example, the first LED 24A is controlled to light-emit when the system ECU 44 selects the door unlock mode, and the second LED 24B is controlled to light-emit when the vehicle door is actually unlocked. As a still further example, the first LED 24A is controlled to light-emit when the system ECU 44 selects the door lock mode, and the second LED 24B is controlled to light-emit when the vehicle door is actually locked. Accordingly, the vehicle door condition will be preferably distinguishable by the user.

Next, the following description will be given for explaining the unlock operation of the vehicle door according to the embodiment of the present invention and the modified example with reference to a flowchart illustrated in FIG. 8.

The system ECU 44 judges at step S100 whether or not the user carrying the portable station 60 is close to the vehicle door. When the portable station 60 is judged to be coming close thereto, the process proceeds to step S101 and the luminous member 24 lights up, or the first LED 24A lights up. At step S102, the system ECU 44 judges whether or not the vehicle door is to be unlocked by the user based upon the manual operation of the door handle 20. More particularly, the vehicle door is judged to be unlocked when the user touches the backside of the door handle 20 for opening the vehicle door. When the vehicle door is judged to be unlocked at step S102, the process then proceeds to step S103. On the other hand, when the vehicle door is not judged to be unlocked at step S102, the process proceeds to step S107, wherein the system ECU 44 judges whether or not a predetermined period of time has passed since the detection of the portable station 60 coming close to the vehicle door. When the predetermined period of time has not passed yet, the process returns to step S102 so as to judge whether or not the vehicle door is to be unlocked by the user. On the other hand, when the predetermined period of time has already passed, the process proceeds to step S 106.

In the meantime, when the vehicle door is judged at step S102 to be unlocked by the user, the process proceeds to step S103 so as to unlock the vehicle door by operating the door lock mechanism 11. At step S104, the LED 24 blinks, or the second LED 24B lights up. At step S105, the system ECU 44 judges whether or not a predetermined period of time has passed since the initial blink of the luminous member 24 or since the initial light-up of the second LED 24B. When the predetermined period of time is judged to have already passed at step S105, the process proceeds to step S106 so as to turn off the light of the luminous member 24, the first LED 24A, and the second LED 24B. As described above, the vehicle door unlock operation is performed according to the present invention.

Next, the following description will be given for explaining the lock operation of the vehicle door according to the embodiment of the present invention and the modified example with reference to a flowchart illustrated in FIG. 9.

The system ECU 44 judges at step S200 whether or not the user carrying the portable station 60 moved from the vehicle inside to the vehicle outside. When the portable station 60 is judged to have moved to the vehicle outside, the process proceeds to step S201 and the luminous member 24 blinks, or the second LED 24B lights up. At step S202, the system ECU 44 judges whether or not the vehicle door is to be locked by the user based upon the manual operation of the door handle 20. More particularly, the vehicle door is judged to be locked when the user touches the front side of the door handle 20 for closing the vehicle door. When the vehicle door is judged to be locked by the user, the process then proceeds to step S203. On the other hand, when the vehicle door is not judged to be locked at step S202, the process proceeds to step S207, wherein the system ECU 44 judges whether or not a predetermined period of time has passed since the detection of the portable station 60 moved to the vehicle outside. When the predetermined period of time has not passed yet, the process returns to step S202 so as to judge whether or not the vehicle door is to be locked by the user. On the other hand, when the predetermined period of time has already passed, the process proceeds to step S206.

In the meantime, when the vehicle door is judged at step S202 to be locked by the user, the process proceeds to step S203 so as to lock the vehicle door by operating the door lock mechanism 11. At step S204, the LED 24 lights up, or the first LED 24A lights up. At step S205, the system ECU 44 judges whether or not a predetermined period of time has passed since the initial light-up of the luminous member 24 or since the initial light-up of the first LED 24A. When the predetermined period of time is judged to have already passed at step S205, the process proceeds to step S206 so as to turn off the light of the luminous member 24, the first LED 24A, and the second LED 24B. As described above, the vehicle door lock operation is performed according to the present invention.

As described above, according to the smart entry system 1 of the present invention, the luminous member 24 (or the first or second LEDS) embedded in the door handle 20 light-emits immediately after the manual operation of the door handle 20 so as to open/close the vehicle door. The light emitted from the luminous member 24 (or the first or second LEDS) can effectively warn the user whether the vehicle door is locked or unlocked. When the door handle 20 is manually operated, the user's eyes are generally turning on the door handle 20. In light of this point, the light emitted from the luminous member 24 can be easily confirmed by the user upon the manual operation of the door handle 20. This can mean that the user can surely confirm the vehicle door condition.

The present invention is not limited only to the above preferred embodiment. For example, when the vehicle door is to be unlocked, the system ECU 44 judges at step S107 in FIG. 8 whether or not the predetermined period of time has passed since the detection of the portable station 60 coming close to the vehicle door. Alternatively, the system ECU 44 can judge at step S107 whether or not the portable station 60 can not be confirmed to be close to the vehicle door any more.

Figure 9:
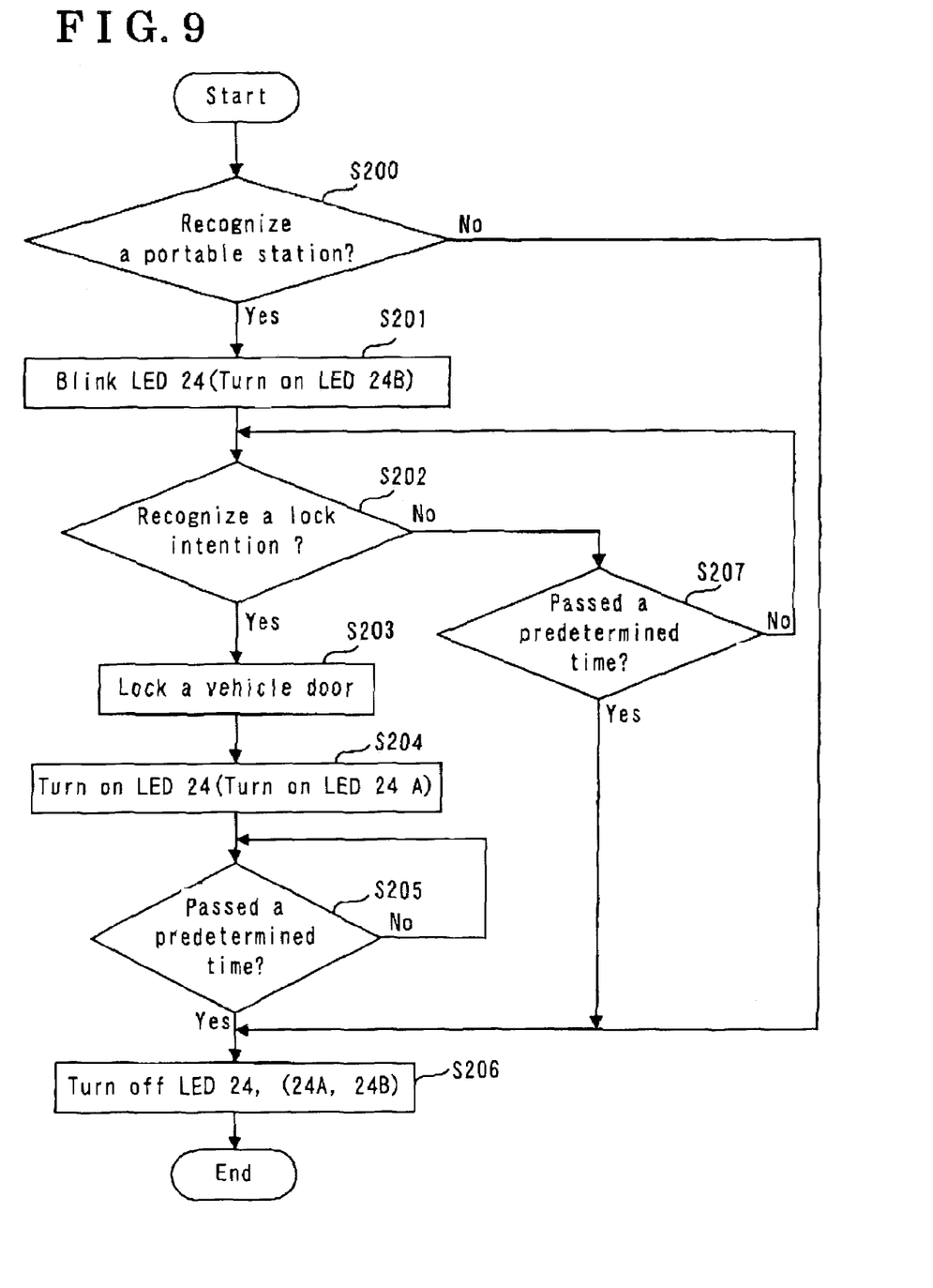
FIG. 9 is a flowchart for explaining a light-emission by the luminous member upon the vehicle door locking operation.

As another example, the process at step S202 in FIG. 9 can be switched with the process at step S200. That is, the system ECU 44 first can judge whether or not the vehicle door is to be locked based upon the manual operation of the door handle 20, and the LED is then controlled to light up or to blink. The system ECU 44 can judge the position of the portable station 60 after the light-up or the blink of the LED. The vehicle door locking operation can be performed in the aforementioned process as well.

Figure 8:
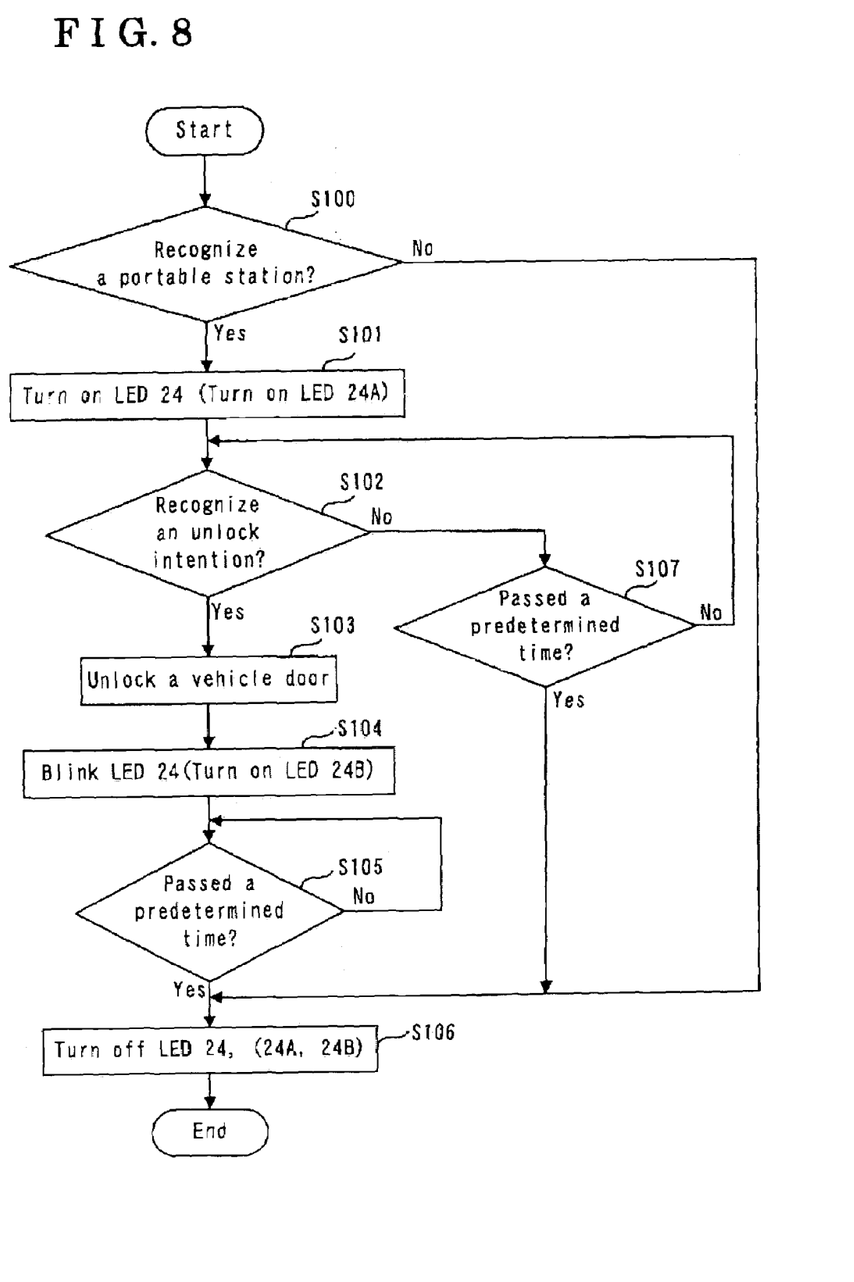
FIG. 8 is a flowchart for explaining a light-emission by the luminous member upon the vehicle door unlocking operation.

As a further example, when the vehicle door is to be unlocked, the luminous member 24 lights up at step S100 in FIG. 8 and blinks at step S104. When the vehicle door is to be locked, the luminous member 24 blinks at step S201 in FIG. 9 and lights up at step S204. Alternatively, the light-up and blink of the luminous member 24 in FIG. 8 can be changed to each other. The light-up and blink of the luminous member 24 in FIG. 9 can be also changed to each other.

As a still further example, the predetermined period of times at steps S105 and S107 can be uniform or different. The predetermined period of times at steps S205 and S207 can be uniform or different as well.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door opening/closing device for a vehicle comprising:
   a door handle operated for opening/closing a vehicle door;
   a door lock mechanism for locking and unlocking the vehicle door;
   a light-emitting means included in the door handle and visible from an outside of the door handle;
   a control mechanism for recognizing the opening/closing operation of the vehicle door based upon the operation of the door handle, operating the door lock mechanism so as to unlock the vehicle door when the opening operation of the vehicle door is recognized, operating the door lock mechanism so as to lock the vehicle door when the closing operation of the vehicle door is recognized, and controlling the light-emitting means to light-emit in response to the opening and closing operation of the vehicle door;
   wherein the control mechanism recognizes the vehicle door opening operation based upon the operation of the door handle under a condition that a portable station carried by a user is close to the vehicle from a vehicle outside, and recognizes the vehicle door closing operation based upon the operation of the door handle and recognition of the portable station moved from a vehicle inside to the vehicle outside;
   wherein the door handle includes at least a first light-emitting means and a second light-emitting means, and the first and second light-emitting means are controlled individually; and
   wherein the control mechanism controls the second light-emitting means to light-emit upon the door unlock operation of the door lock mechanism and controls the first light-emitting means to light-emit upon the door lock operation thereof.

2. A door opening/closing device for a vehicle comprising:
   a door handle operated for opening/closing a vehicle door;
   a door lock mechanism for locking and unlocking the vehicle door;
   a light-emitting means included in the door handle and visible from an outside of the door handle;
   a control mechanism for recognizing the opening/closing operation of the vehicle door based upon the operation of the door handle, operating the door lock mechanism so as to unlock the vehicle door when the opening operation of the vehicle door is recognized, operating the door lock mechanism so as to lock the vehicle door when the closing operation of the vehicle door is recognized, and controlling the light-emitting means to light-emit in response to the opening and closing operation of the vehicle door;
   wherein the control mechanism recognizes the vehicle door opening operation based upon the operation of the door handle under a condition that a portable station carried by a user is close to the vehicle from a vehicle outside, and recognizes the vehicle door closing operation based upon the operation of the door handle and recognition of the portable station moved from a vehicle inside to the vehicle outside;
   wherein the door handle includes at least a first light-emitting means and a second light-emitting means, and the first and second light-emitting means are controlled individually; and
   wherein the control mechanism controls the first light-emitting means to light-emit when the portable station is recognized to be close to the vehicle from the vehicle outside, and controls the second light-emitting means to light-emit when the portable station is recognized to have moved from the vehicle inside to the vehicle outside.

3. A door opening/closing device for a vehicle comprising:
   a door handle operated for opening/closing a vehicle door;
   a door lock mechanism for locking and unlocking the vehicle door;
   a light-emitting means included in the door handle and visible from an outside of the door handle;
   a control mechanism for recognizing the opening/closing operation of the vehicle door based upon the operation of the door handle, operating the door lock mechanism so as to unlock the vehicle door when the opening operation of the vehicle door is recognized, operating the door lock mechanism so as to lock the vehicle door when the closing operation of the vehicle door is recognized, and controlling the light-emitting means to light-emit in response to the opening and closing operation of the vehicle door;
   wherein the control mechanism recognizes the vehicle door opening operation based upon the operation of the door handle under a condition that a portable station carried by a user is close to the vehicle from a vehicle outside, and recognizes the vehicle door closing operation based upon the operation of the door handle and recognition of the portable station moved from a vehicle inside to the vehicle outside;
   wherein the door handle includes at least a first light-emitting means and a second light-emitting means, and the first and second light-emitting means are controlled individually; and
   wherein the control mechanism controls the second light-emitting means to light-emit when the door handle operation is recognized for the vehicle door opening operation, and controls the first light-emitting means to light-emit when the door handle operation is recognized for the vehicle closing operation.

4. A method of recognizing an opening operation of a vehicle door comprising:
   recognizing that a user carrying a portable station is coming close to a vehicle from a vehicle outside;
   controlling a light-emitting means to emit light when the user carrying the portable station is recognized to be coming close to the vehicle;
   judging whether or not a user's hand is in contact with a door handle;
   unlocking the vehicle door by operating a door lock mechanism when the user's hand is judged to be in contact with the door handle; and
   controlling the light-emitting means to emit light for a predetermined time in a different manner from a light-emitting manner during the portable station coming close to the vehicle from the vehicle outside;
   wherein the light-emitting means is controlled to continuously light-up when the user carrying the portable station is recognized to be coming close to the vehicle and the light emitting means is controlled to blink for the predetermined time when the vehicle door is unlocked.

5. A method of recognizing an opening operation of a vehicle door according to claim 4, wherein the light-emitting means includes a first light-emitting means and a second light emitting means, the first light-emitting means is controlled to light-up when the user carrying the portable station is recognized to be coming close to the vehicle and the second light-emitting means is controlled to light-up for the predetermined period of time when the vehicle door is unlocked.

6. A method of recognizing a closing operation of a vehicle door comprising:
   recognizing that a user carrying a portable station has moved from a vehicle inside to a vehicle outside;
   controlling a light-emitting means to emit light when the user carrying the portable station is recognized to have moved from the vehicle inside to the vehicle outside;
   judging whether or not a user's hand is in contact with a door handle;
   locking the vehicle door by operating a door lock mechanism when the user's hand is judged to be in contact with the door handle; and
   controlling the light-emitting means to emit light in a different manner from a light-emitting manner during the portable station having moved to the vehicle outside from the vehicle inside;
   wherein the light-emitting means is controlled to blink when the user carrying the portable station is recognized to have moved from the vehicle inside to the vehicle outside and the light emitting means is controlled to continuously light-up when the vehicle door is locked.

7. A method of recognizing a closing operation of a vehicle door according to claim 6, wherein the light-emitting means includes a first light-emitting means and a second light emitting means, the second light-emitting means is controlled to light-up when the user carrying the portable station is recognized to have moved from the vehicle inside to the vehicle outside and the first light-emitting means is controlled to light-up when the vehicle door is locked.

* * * * *